United States Patent [19]

Otani et al.

[11] 4,115,527

[45] Sep. 19, 1978

[54] PRODUCTION OF CARBON FIBERS HAVING HIGH ANISOTROPY

[75] Inventors: Sugio Otani, Kiryu; Shoji Watanabe, Niigata; Tadashi Araki, Tokyo, all of Japan

[73] Assignees: Kureha Kagaku Kogyo Kabushiki Kaisha, Tokyo; Toyo Boseki Kabushiki Kaisha, Osaka, both of Japan

[21] Appl. No.: 755,603

[22] Filed: Dec. 29, 1976

Related U.S. Application Data

[63] Continuation-in-part of Ser. No. 564,895, Apr. 3, 1975, Pat. No. 4,016,247, which is a continuation-in-part of Ser. No. 20,050, Mar. 16, 1970, abandoned.

[30] Foreign Application Priority Data

Mar. 31, 1969 [JP] Japan ................................. 44-24161

[51] Int. Cl.² .............................................. D01F 9/14
[52] U.S. Cl. .............................. 423/447.4; 264/29.2; 423/447.6
[58] Field of Search ............... 423/447.4, 447.1, 447.2, 423/447.6, 447.8; 264/29.1, 29.2; 208/39, 40, 44

[56] References Cited

U.S. PATENT DOCUMENTS

| Re. 22,794 | 10/1973 | Otani | 423/447.6 |
|---|---|---|---|
| 3,629,379 | 12/1971 | Otani | 423/447.6 |
| 3,702,054 | 11/1972 | Araki et al. | 423/447.4 X |
| 3,787,541 | 1/1974 | Grindstaff et al. | 423/447.1 X |
| 4,005,183 | 1/1977 | Singer | 423/447.2 |
| 4,032,430 | 6/1977 | Lewis | 264/29.2 |

*Primary Examiner*—Edward J. Meros
*Attorney, Agent, or Firm*—Wenderoth, Lind & Ponack

[57] ABSTRACT

In the production of carbon shaped articles such as fibers having high molecular orientation, anisotropy, strength, and modulus of elasticity through the steps of forming raw material pitch into fibers, infusibilization of the same followed by carbonization optionally graphitization, a raw material pitch having particular physical properties such as melt viscosity of 0.4 to 700 poises at a temperature range of 320° to 480° C, eminent structural anisotropy, and fluidity is used to produce such fibers product.

2 Claims, No Drawings

PRODUCTION OF CARBON FIBERS HAVING HIGH ANISOTROPY

CROSS-REFERENCE TO A RELATED APPLICATION

This application is a continuation-in-part application of Application Ser. No. 564,895, filed Apr. 3, 1975, now U.S. Pat. No. 4,016,247 which is in turn a continuation-in-part application of Application Ser. No. 20,050, filed Mar. 16, 1970 for "Production of Carbon Shaped Articles Having High Anisotropy", now abandoned.

BACKGROUND OF THE INVENTION a. Field of the Invention

This invention relates to an improved method of producing carbonaceous or graphitic articles in fibrous form having high anisotropy be selecting a substance having particular chemical structure and properties as a carbon precursor. (The carbonaceous or graphitic fibers will hereinafter be called in general term "carbon fibers".)

b. Discussion of Prior Arts

There have been known several methods of producing carbon shaped articles, particularly carbon fibers, representative methods of which are as follows:

(1) A method, in which the fibers made of natural or synthetic high polymer materials such as polyacrylonitrile, polybenzimidasole, cellulose, etc. are baked.

(2) A method, in which pitch as a raw material is formed into a fibrous shape by melt-spinning, thereafter subjecting the fibers to infusibilization treatment and then to carbonization.

The abovementioned second method has been invented by one of the present inventors, and is suited for obtaining products of uniform quality and high strength, as taught in U.S. Pat. No. Re. 27,794 (Otani) and No. 3,629,379 (Otani).

The characteristic feature of producing the carbon fibers from pitch as taught in the abovementioned patents is such that natural or synthetic organic compounds are baked at a temperature of from 300° to 500° C (heat-treatment in an inert gas atmosphere) to obtain a pitch substance in a molten state, then the molten pitch substance is subjected to meltspinning, and the thus spun filaments are oxidized to infusibilize so that the individual filament may not be fused together by further heat-treatment, after which the infusibilized filaments are subjected to carbonization. In this case, the melt-spinning is carried out by using the raw material pitch of a particular class having a mean molecular weight of 400 and above. The thus spun filaments are then subjected to the infusibilization treatment and carbonization, followed by, if necessary, the graphitization treatment, thereby obtaining the carbonaceous or graphitic fibers.

However, no precise study has ever been made as to the molecular orientation of the carbonaceous or graphitic fibers obtained by the patented methods, and the relationship between the crystal growth and the physical properties or structure of the raw material pitch as well.

The present inventors have conducted further studies and experiments on the abovementioned problems, and have finally found out that carbonaceous or graphitic fibers having high modulus of elasticity and excellent crystal orientation, particularly high anisotropy, can be obtained by the use of carbon precursors with particularly orientable molecular class as the principal constituent.

The present invention is directed to a more limited definition of the pitch in its physical properties to suit the purpose of obtaining carbon fibers having the modulus of elasticity of 1,400 tons/cm$^2$ and above, which is at the present moment made the object of practical use as the cabonaceous or graphitic fibers for reinforcement purpose.

SUMMARY OF THE INVENTION

It is therefore an object of the present invention to provide a method for producing carbon fibers having high anisotropy and high modulus of elasticity from raw material pitch.

It is another object of the present invention to provide a method for obtaining the abovementioned pitch suited for the raw material to produce carbon fibers having such excellent properties.

The foregoing objects, other objects as well as the principle of the present invention will become more apparent from the following detailed description of the invention together with preferred embodiments thereof.

DETAILED DESCRIPTION OF THE INVENTION

For the purpose of the present invention, the term "anisotropy" is meant by the optical anisotropy, and the term "anisotropy of the raw material pitch" is meant by the anisotropic portions to be recognizable from observation through the polarization microscope on the polished surface of the raw material pitch in its cross-section, which has been cooled to solidify from its molten state having a melt-viscosity thereof of lower than 700 poises. Also, the term "anisotropy of the carbon fibers" is meant by the orientation in the axial direction to be recognized from observation through the polarization microscope on the polished surface of the carbon fibers in its cross-section, which is parallel to the axial direction of such carbon fibers, and the orientation in the axial direction of the planar molecules by the X-ray analyses.

The most suitable raw material pitch to obtain the carbon fibers according to the present invention has the carbon content in the range of from 95 to 96.5% by weight, a mean molecular weight of more than 400, and is capable of assuming a uniform molten state at a temperature range of from 320° to 480° C, and showing the melt viscosity of higher than 0.4 poise but not exceeding 700 poises, and is anisotropic to the extent that an isotropic portion thereof can hardly be recognized with a polarization microscope examination on a polished surface thereof.

In the following, detailed explanations will be given as to the method of obtaining the pitch exhibiting such high anisotropy.

Generally speaking, according to the present inventors, it has been found out that the abovementioned pitch of high anisotropy can be obtained by subjecting an organic substance to heat-treatment under specific conditions which vary with the chemical composition of the organic substance. For example, when the organic substance is a highly condensed polycyclic compound having seven rings or more and having large flatness in the molecular structure as a main component, it is heated at a temperation of 380° to 600° C for 30 to 600 minutes, preferably at a temperature of 450° to 600° C for 30 to 90 minutes, in a non-oxidizing atmosphere.

On the other hand, when the organic substance is a condensed polycyclic compound having less than seven rings as a main component, it is heat-treated with two steps, namely it is heated to 300° to 500° C as is described in U.S. Patent No. Re 27794 as the first step and then heated to 380° to 450° C for 60–300 minutes as the second step, the both steps being carried out in a non-oxidizing atmosphere. These condensed polycyclic compounds are not necessarily pure products, but they may be a mixture of two or more such compounds, or those such as pitches.

In practice, when a compound containing therein, as the basic skeleton, a condensed polycyclic structure having not less than seven rings, and, in some cases, substituent groups such as methyl group, amino group, and so forth in certain numbers, and quinone-type oxygen as well is heated to a temperature immediately before coking, the compound generally exhibits a state, in which the molecular structures become planar and parallel each other due to the condensed polycyclic structures of the compound and the polycondensation having taken place among the condensed polycyclic structures.

Further, the substance having fluidity even at a temperature of 400° C and above obtained by subjecting resinous pitch or tar obtained by heat-treating crude petroleum oil or its fractionated components at a temperature of from 700° C to 2,000° C for a cracking time of from 1/1,000 to 1/10 second to heating at a temperature of 250° to 550° C for 1 to 300 minutes and distilling off rather volatile matters during the heating, and then by subjecting the material to the second heating at a temperature of 380° to 450° C for 60 to 300 minutes in which a procedure of removing fine solid particles by filtration is included, has also been verified to be the anisotropic pitch.

When any one or a mixture of the afore-described anisotropic pitch substances is used for shaping carbon fiber, those which have been cooled to solidify from its molten state with the melt viscosity of less than 700 poises scarcely show isotropic portion, when observed by a polarization microscope. Further, when these substances are shaped, into fibers, and then the fibers are observed through the polarization microscope and X-ray diffraction along the polished surface of the fibers in parallel with the axial direction of the fibers, there can be recognized orientation of the planar molecules in the axial direction of the fibers.

The fibers made from aforementioned anisotropic pitch, when subjected to carbonization or graphitization, whether or not they are infusibilized, have been verified by X-ray observation to have orientation as high as that of the so-called high modulus carbon fibers which were subjected to the orientation-elongation at a graphitization stage.

The modulus of elasticity of the fibers from these substances is also improved in comparison with the shaped articles obtained from the conventional pitch material. That is, with the substances of the present invention, the carbon fibers having the Young's modulus of more than 1,400 tons/cm$^2$ are found producible. It is now clear that extremely unique effect can be obtained by the use of this kind of pitch exhibiting the anisotropy.

In summary of the foregoing explanations, there can be present carbon precursors, raw material pitch, having stable fluidity with the viscosity of from 0.4 to 700 poises at a temperature below the thermal decomposition temperature as seen in a few instances as already stated in the foregoing, and, at the same time, exhibiting anisotropy, which can be recognized by observation through the polarization microscope after cooling of the substance. Use of such substances as the raw material is the fundamental concept of the present invention. Such raw material is shaped into fibers by the ordinary methods. When manufacturing the carbon fibers, melt-spinning method is advantageous, and other methods such as extrusion, compression, centrifugal method, spray, and the like methods can all be used effectively.

The infusibilization treatment after shaping as is the case with the pitch fibers is carried out in an oxidizing atmosphere such as ozone, oxygen, oxides of nitrogen, halogens, and sulfur trioxides ($SO_3$), or an atmosphere containing therein one or more kinds of these gases, or in sulfur vapor. Contact-treatment of the pitch fibers after the oxidation treatment with ammonia gas not only accelerates the infusibilization, but also improves the carbonization yield and the mechanical strength of the resulting carbon fibers. It is also recognized that, by this treatment, the molecular orientation of the fibers at the temperature of from 700° to 1,500° C, for example, or at the stage of carbonaceous structure from the crystallographic standpoint, is strengthened. Such strengthening effect can also be clearly recognized at the stage of the heat-treatment higher than 1,500° C, wherein the impairment in the crystallinity and molecular orientation of the fibers subjected to the oxidation-treatment alone can be safeguarded by this ammonia treatment. Since the raw material used in the present invention is generally of a high softening point and large heat stability, the infusibilization treatment can be done under a stronger conditions than in the case of the conventional pitch fibers. It is generally practiced within a few hours at a temperature between a normal temperature and a temperature at which the object to be treated causes no softening and deforming. The fibers which has completed the infusibilization is calcined in a non-oxidizing atmosphere to be carbonized or graphitized.

PREFERRED EMBODIMENTS

In order to enable those skilled in the art to reduce the present invention into practice, the following actual example is presented. It should, however, be noted that this example is merely illustrative, and that changes and modifications may be made within the spirit and scope of the present invention as set forth in the appended claims.

EXAMPLE

A pitch obtained by removing distillable components at 380° C/10 mm Hg or below by the distillation under reduced pressure of a tar substance produced by thermal cracking of crude petroleum oil (Seria origin) at 1,800° C for 4/1,000 second was melted to eliminate fine particles of non-melting components therein at 410° C for 270 minutes, whereby pitch substance showing a uniform molten state at 350° C to 420° C and the melt-viscosity of about 350 poises. The pitch indicated the desired anisotropy, and had the carbon content of 96.5% and the mean molecular weight of 650. According to observation through a polarization microscope, this pitch was found to have perfect orientation, and, as the result of the elementary analyses, X-ray analyses, infrared ray spectrum, and other measurements, it was further found to be an aromatic hydrocarbon compound containing 2.7% sulfur, in which two units of condensed polycyclic structure containing 7 to 9 rings are linked together by a single number of bridge, and less than one in average of methyl group alone is contained in the unit structure.

This pitch was melt-spun at 400° C to 420° by using a rotary cylindrical spinning machine of 100 mm dia., 20 mm deep, and having 30 tiny holes of 0.3 mm each, at a rotational speed of about 800 rpm, whereby pitch fibers of about 15 microns in diameter was obtained. This pitch fiber was also recognized to have high molecular orientation in the axial direction through the polarization microscope. The X-ray observation also revealed high orientation. The carbonization yield of the fiber after the infusibilization and carbonization was 92% and its elasticity modulus was measured at 2,800 tons/cm$^2$. The degree of orientation due to the X-ray analyses was 85% with $L_c$ 600Å, $L_a$ 1,000 Å, and $d_{002}$ 3.368Å, measured by Gakushin method.

What is claimed is:

1. In a method of producing carbon fibers having high molecular orientation, anisotropy, strength and modulus of elasticity from pitch as the raw material through the process steps of forming the pitch into fibers, subjecting the same to infusibilization, carbonization, and optionally graphitization treatments, the improvement which comprises forming said raw material pitch through the steps of
    (a) heat-treating crude petroleum oil or its fractionated components at a temperature of from 700° C to 2000° C for a period of from 1/1000 to 1/10 second to form resinous pitch or tar,
    (b) subjecting the resinous pitch or tar thus-obtained to heat treating at a temperature of 250° C to 550° C for 1 to 300 minutes while distilling off rather volatile matters, and
    (c) subjecting the thus heat-treated resinous pitch or tar to a second heating at a temperature of 380° to 450° C for 60 to 300 minutes while removing fine solid particles by filtration,
    said raw material pitch thus-obtained having a carbon content in the range of from 95% to 96.5% by weight, a mean molecular weight of from 400 to 2,000, a melt viscosity of from 0.4 to 700 poises at a temperature range of from 320° C to 480° C, and optical anisotropy to such an extent that an isotropic portion thereof can hardly be recognized on examination by a polarization microscope.

2. The improvement according to claim 1, wherein in step (a), the crude petroleum oil or its fractionated components is heated at 1800° C for 4/1000 second to obtain a resinous pitch or tar, the resinous tar or pitch is then heated at a temperature and time sufficient to remove volatile components which are distilled off at 380° C/10 mmHg or below under reduced pressure according to step (b) and then heating the pitch to 410° C to eliminate the non-melting components according to step (c).

* * * * *